(12) United States Patent
Yonce et al.

(10) Patent No.: US 10,050,420 B1
(45) Date of Patent: Aug. 14, 2018

(54) CONVERSION SYSTEM FOR A SWITCHGEAR ASSEMBLY

(71) Applicant: Eaton Corporation, Cleveland, OH (US)

(72) Inventors: Larry Eugene Yonce, Greenwood, SC (US); Patrick J. Adams, Greenwood, SC (US); Barry Tuck Rambo, Bradley, SC (US); Aaron Michael Rexroad, Greenwood, SC (US); Michael Dean Sigmon, Darlington, SC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/431,956

(22) Filed: Feb. 14, 2017

(51) Int. Cl.
*H02B 11/127* (2006.01)
*H02B 5/06* (2006.01)
*H02B 13/035* (2006.01)

(52) U.S. Cl.
CPC ............. *H02B 11/127* (2013.01); *H02B 5/06* (2013.01); *H02B 13/035* (2013.01)

(58) Field of Classification Search
CPC ...... H02B 5/06; H02B 11/133; H02B 13/035; H02B 13/0352; H02B 1/36; H02B 1/32; H02B 11/127; H02B 11/167; H02B 11/12; H02B 11/18; H02B 1/14; H02B 11/28; H02B 11/173; H02B 11/22
See application file for complete search history.

(56) References Cited

U.S. PATENT DOCUMENTS

| 2,563,441 | A | * | 8/1951 | Wood | H02B 11/133 174/50 |
| 2,646,481 | A | * | 7/1953 | Wood | H01H 9/34 218/148 |
| 2,858,389 | A | * | 10/1958 | Cuorato | H02B 11/04 200/50.26 |
| 5,036,427 | A | * | 7/1991 | Krom | H02B 11/127 200/50.17 |
| 7,019,230 | B1 | * | 3/2006 | Vaill | H02B 3/00 200/50.21 |
| 2010/0002363 | A1 | * | 1/2010 | Kurogi | H02B 13/01 361/606 |

(Continued)

*Primary Examiner* — Adam B Dravininkas
(74) *Attorney, Agent, or Firm* — Benesch Friedlander Coplan & Aronoff LLP

(57) ABSTRACT

An apparatus is configured for use with a switchgear assembly having a frame that defines at least one switchgear cell, stationary disconnects oriented vertically on the frame, and horizontal draw-out disconnects remote from the frame. In a given example, the apparatus includes an adapter assembly including vertical disconnects, horizontal disconnects, and bus work connecting the vertical disconnects with the horizontal disconnects. The adapter assembly is configured to take an installed position in the switchgear cell, with the vertical disconnects in the adapter assembly projecting upward into engagement with the stationary disconnects on the frame. The adapter assembly is further configured for the horizontal disconnects in the adapter assembly to engage and disengage from the horizontal draw-out disconnects upon movement of the horizontal draw-out disconnects horizontally into and out of engagement with the adapter assembly when the adapter assembly is in the installed position.

22 Claims, 4 Drawing Sheets

(56) References Cited

U.S. PATENT DOCUMENTS

| | | | |
|---|---|---|---|
| 2010/0208416 A1* | 8/2010 | Shoda | H02B 13/0354 361/606 |
| 2012/0182669 A1* | 7/2012 | Patten | H02B 11/04 361/637 |
| 2016/0241003 A1* | 8/2016 | Frye | H02B 13/00 |

* cited by examiner

US 10,050,420 B1

CONVERSION SYSTEM FOR A SWITCHGEAR ASSEMBLY

TECHNICAL FIELD

This technology relates to switchgear apparatus for opening and closing electrical circuits.

BACKGROUND

As shown in FIG. 1, a portion of a known switchgear assembly 10 includes a frame 12 and a draw-out assembly 16. The frame 12 defines a switchgear cell 17, and supports an array of switchgear stationary disconnects 20. The number and arrangement of stationary disconnects 20 can differ as known in the art, but in the given example the stationary disconnects 20 project vertically upward in front and rear rows 22 and 24 of three. Each row 22 and 24 of stationary disconnects 20 has an assembly of bus bars 26, also known as bus work, for connection to either a current source or load. The draw-out assembly 16 has a corresponding array of vertical disconnects 30 arranged in front and rear rows 32 and 34 of three.

The draw-out assembly 16 further includes pole units 36, one of which is shown in the view of FIG. 1, and a circuit breaker 38. Each pole unit 36 interconnects a vertical disconnect 30 in the front row 32 with another in the rear row 34. The circuit breaker 38 is operatively associated with the pole units 36 to open and close the electrical current paths between the two rows 32 and 34 of vertical disconnects 30.

The frame 12 stands on a building floor 40, and provides a cell floor 41. The draw-out assembly 16 is supported on the building floor 40 by wheels 42. In use, the draw-out assembly 16 is rolled into the cell 17 from the building floor 40 onto the cell floor 41 to a position in which the vertical disconnects 30 are aligned beneath the stationary disconnects 20. A lifting mechanism (not shown) of known construction is then actuated to lift the draw-out assembly 16 to an engaged position in which the vertical disconnects 30 project upward into the stationary disconnects 20 in operative relationship with the stationary disconnects 20. Specifically, the draw-out assembly 16 has side flanges 46, and the frame 12 includes a lift assembly 48 that is shown partially in FIG. 1. Elevator portions 50 of the lift assembly 48 are configured to receive the side flanges 46 in weight-bearing relationship for the lifting mechanism to carry the draw-out assembly 16 upward to the engaged position. The circuit breaker 38 is then engaged with the stationary disconnects 20 to control the passage of electric current between the two rows 22 and 24 of stationary disconnects 20.

When the circuit breaker 38 is to be disengaged from the stationary disconnects 20, the lifting mechanism is actuated to lower the draw-out assembly 16 from the engaged position, and thereby to withdraw the vertical disconnects 30 from the stationary disconnects 20. The draw-out assembly 16 is thus known as a vertical draw-out assembly or vertical draw-out circuit breaker assembly because it must be moved upward or downward in the vertical direction to engage or disengage the circuit breaker 38 to and from the stationary disconnects 20.

SUMMARY

An apparatus is configured for use with a frame defining at least one switchgear cell, stationary disconnects oriented vertically on the frame, and horizontal draw-out disconnects remote from the frame.

In a given example, the apparatus comprises an adapter assembly including vertical disconnects, horizontal disconnects, and bus work connecting the vertical disconnects with the horizontal disconnects. The adapter assembly is configured to take an installed position in the switchgear cell, with the vertical disconnects in the adapter assembly projecting upward into engagement with the stationary disconnects on the frame.

The adapter assembly is further configured for the horizontal disconnects in the adapter assembly to engage and disengage from the horizontal draw-out disconnects upon movement of the horizontal draw-out disconnects into and out of engagement with the adapter assembly when the adapter assembly is in the installed position.

Summarized differently, an apparatus is configured for use with a frame defining at least one switchgear cell, stationary disconnects oriented vertically on the frame, and horizontal disconnects that are fixed to the frame in engagement with the stationary disconnects. The apparatus thus comprises a draw-out assembly including a circuit breaker, pole units operatively interconnected with the circuit breaker, and horizontal disconnects projecting from the pole units. The draw-out assembly is configured for movement horizontally into and out of an engaged position in which the horizontal disconnects on the draw-out assembly operatively engage the horizontal disconnects fixed to the frame.

Additionally, a method is provided for interconnecting horizontal draw-out disconnects with stationary disconnects oriented vertically on a switchgear frame defining a cell. The method includes moving vertical disconnects horizontally into the cell to lower positions in which the vertical disconnects are aligned beneath the stationary disconnects. The vertical disconnects are further moved vertically within the cell from the lower positions to raised positions in which the vertical disconnects engage the stationary disconnects. When the vertical disconnects are in the raised positions, horizontal draw-out disconnects are moved horizontally into engaged positions electrically interconnected with the vertical disconnects and, in turn, the stationary disconnects.

DETAILED DESCRIPTION

Figure 1:
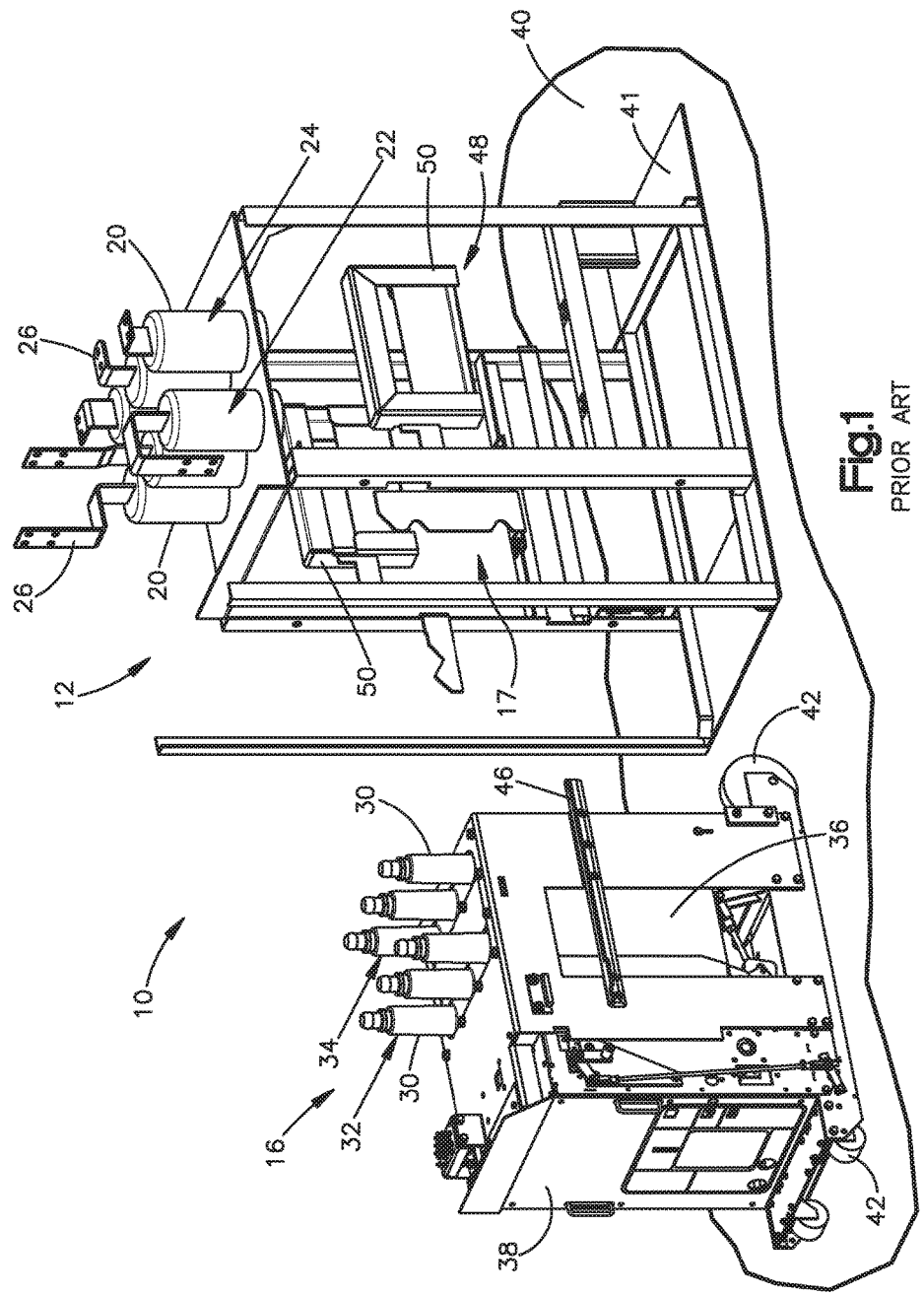
FIG. 1 is a side view of a known apparatus including a switchgear cell and a draw-out assembly.

The structures illustrated in the drawings include examples of the elements recited in the claims. The illustrated structures thus include examples of how a person of ordinary skill in the art can make and use the claimed invention. These examples are described to meet the enablement and best mode requirements of the patent statute without imposing limitations that are not recited in the claims. Elements of one embodiment may be used in combination with, or as substitutes for, elements of another as needed for any particular implementation of the invention.

Figure 2:
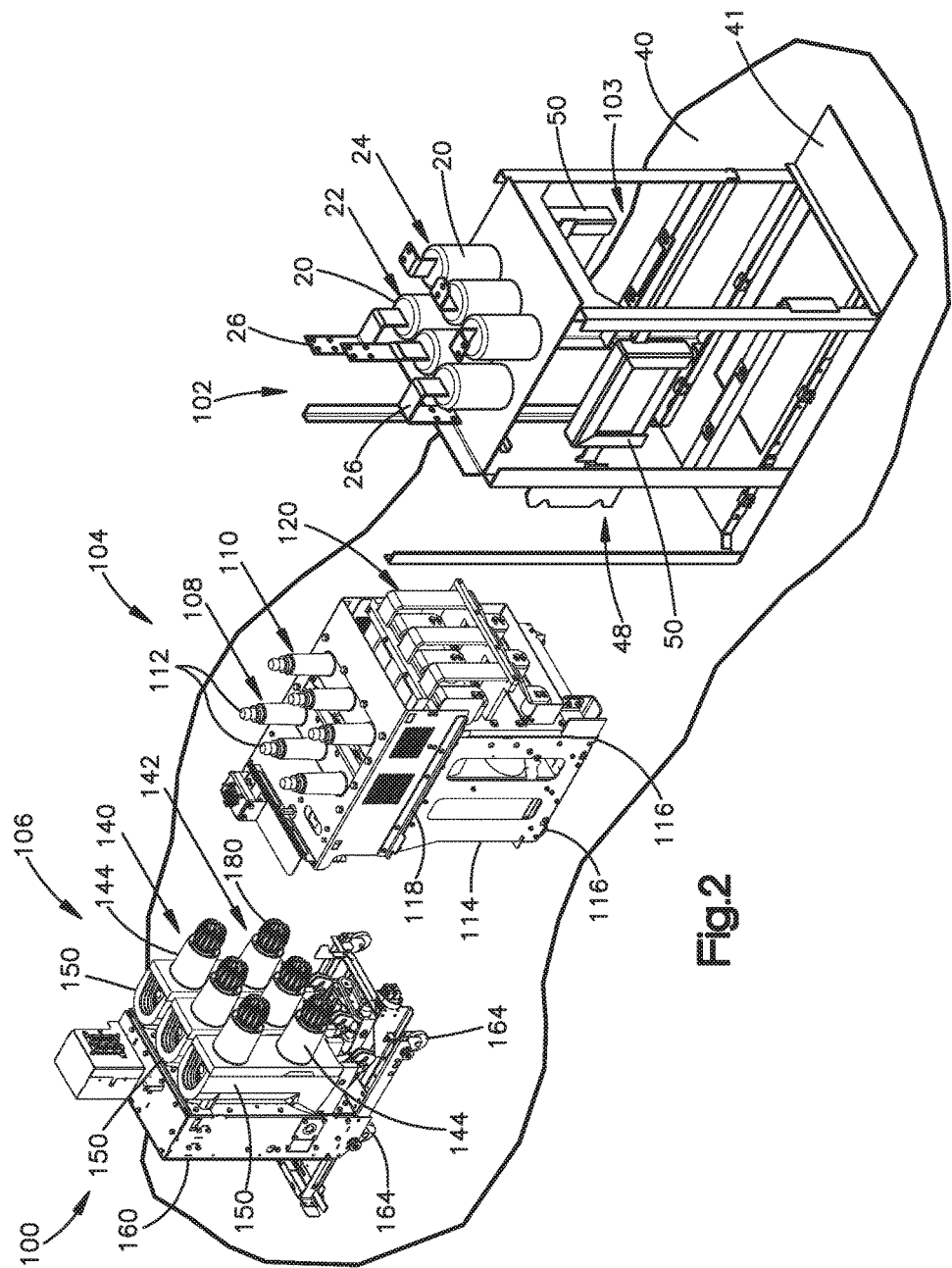
FIG. 2 is a perspective view of a switchgear cell, an adapter assembly, and a horizontal draw-out assembly.

As shown in FIG. 2, parts of a switchgear assembly 100 may include a frame 102 that defines a switchgear cell 103, an adapter assembly 104, and a horizontal draw-out assembly 106.

The frame 102 of FIG. 2 is the same or substantially the same as the frame 12 of FIG. 1, as indicated by the use of the same reference numerals for corresponding parts of the two frames 12 and 102. The frame 102 of FIG. 2 is thus configured to stand on a floor 40, and includes a lift assembly 48 with elevators 50. Front and rear rows 22 and 24 of switchgear stationary disconnects 20 are oriented vertically on the frame 102. The stationary disconnects 20 have an assembly of bus bars 26 for carrying current between a source and a load.

The adapter assembly 104 has front and rear rows 108 and 110 of vertical disconnects 112 corresponding to the stationary disconnects 20 on the frame 102. The vertical disconnects 112 are carried on an adapter frame 114 with wheels 116 for rolling movement into and out of the cell 103. The adapter frame 114 has side flanges 118 for engaging the elevators 50 on the switchgear frame 102.

Figure 3:
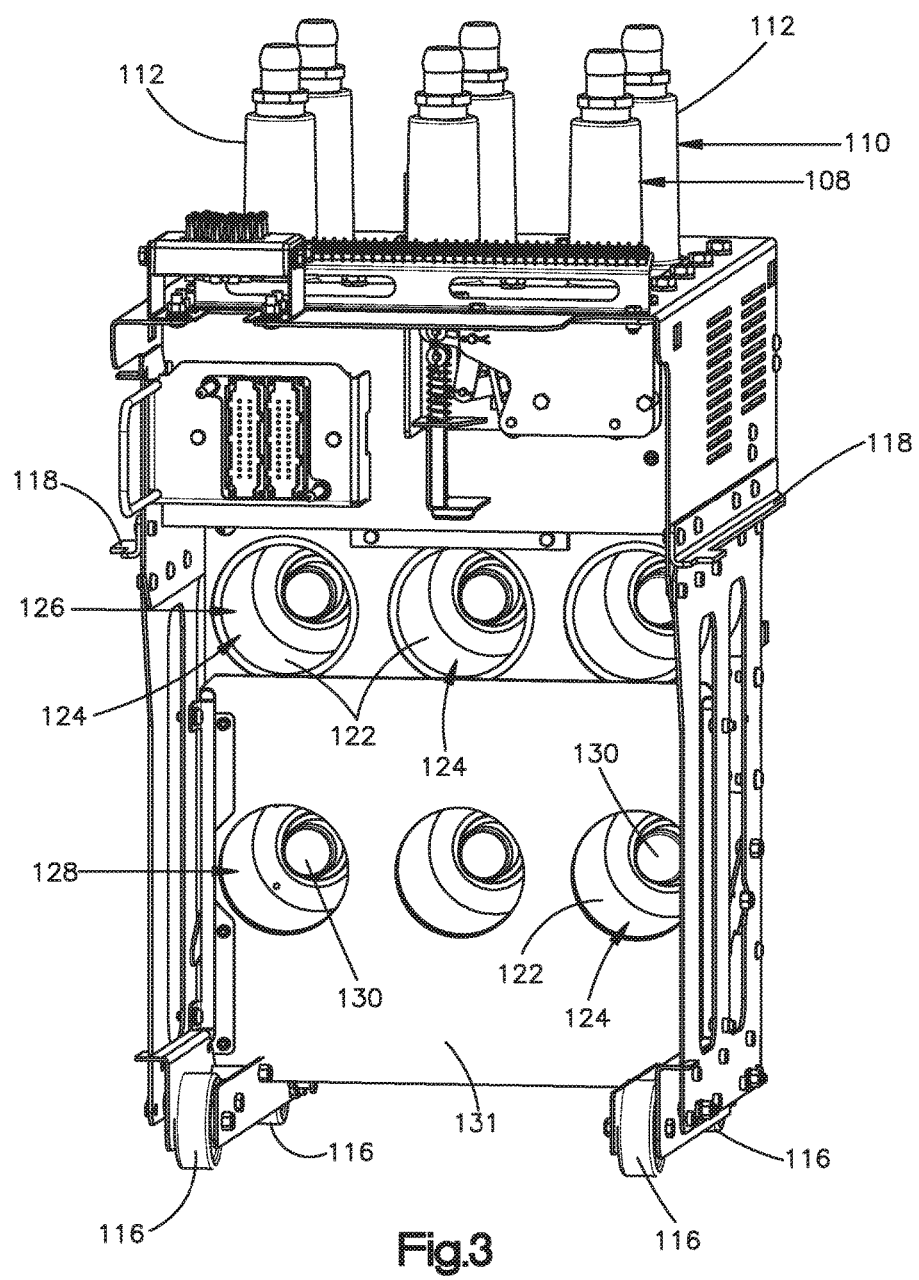
FIG. 3 is a perspective view of the adapter assembly of FIG. 2.

Also carried on the adapter frame 114 is an assembly of bus work 120. As shown in FIG. 3, the bus work 120 has horizontal tubular portions 122 with open front ends 124. Each tubular portion 122 of the bus work 120 corresponds to one of the vertical disconnects 112. Accordingly, the tubular portions 122 in this example are arranged in upper and lower rows 126 and 128 of three. The upper row 126 of tubular portions 122 corresponds to the front row 108 of vertical disconnects 112. The lower row 128 of tubular portions 122 corresponds to the rear row 110 of vertical disconnects 112.

In addition to the vertical disconnects 112, the adapter assembly 104 further has a corresponding array of horizontal disconnects 130. Each of the horizontal disconnects 130 is contained in a respective one of the tubular portions 122 of the bus work assembly 120, as shown in FIG. 3. The horizontal disconnects 130 are concealed by a safety shutter 131 that is movable vertically over open ends 124 of the tubular portions 122 to prevent inadvertent contact with the tubular portions 122 and the horizontal disconnects 130. The bus work 120 provides permanent electrical interconnection between the horizontal and vertical disconnects 130 and 112 on the adapter assembly 104.

The horizontal draw-out assembly 106 includes upper and lower rows 140 and 142 of horizontal disconnects 144. Those horizontal disconnects 144 correspond to the horizontal disconnects 130 on the adapter assembly 104. Each of three pole units 150 on the draw-out assembly 106 interconnects a horizontal disconnect 144 in the upper row 140 with another in the lower row 142. A circuit breaker 160, which in the given example is a power circuit breaker, is included in the draw-out assembly 106 and is operatively associated with the pole units 150 to open and close the electrical current paths between the two rows 140 and 142 of horizontal disconnects 144. For this purpose the circuit breaker 160 may be configured in any suitable manner known in the art. Wheels 164 support the draw-out assembly 106 for rolling movement back and forth from the building floor 40 onto the cell floor 41. Because the horizontal draw-out assembly 106 includes the circuit breaker 160, the horizontal draw-out assembly 106 may also be referred to as a horizontal draw-out circuit breaker assembly.

In use, the adapter assembly 104 is rolled into the cell 103 to a position in which the vertical disconnects 112 are aligned beneath the stationary disconnects 20. A lifting mechanism (not shown), which may be of known construction as noted above, is then actuated to raise the elevators 50 into weight-bearing relationship with the side flanges 118 on the adapter assembly 104. The lifting mechanism is further actuated to raise the adapter assembly 104 from the lower position to an engaged position in which the vertical disconnects 112 project upward into the stationary disconnects 20 in operative engagement with the stationary disconnects 20.

When the adapter assembly 104 has been raised to the engaged position, it can be installed on the frame 102 in that position. For example, the wheels 116 may be removed, and an attachment assembly 170 may fasten the adapter assembly 104 to the frame 102. The attachment assembly 170 in the illustrated embodiment includes brackets 172 at opposite sides of the adapter assembly 104 and the frame 102, as shown partially in the side view of FIG. 4. Additionally, the attachment assembly 170 may be configured for releasably securing the draw-out assembly 106 to the adapter assembly 104.

Figure 4:
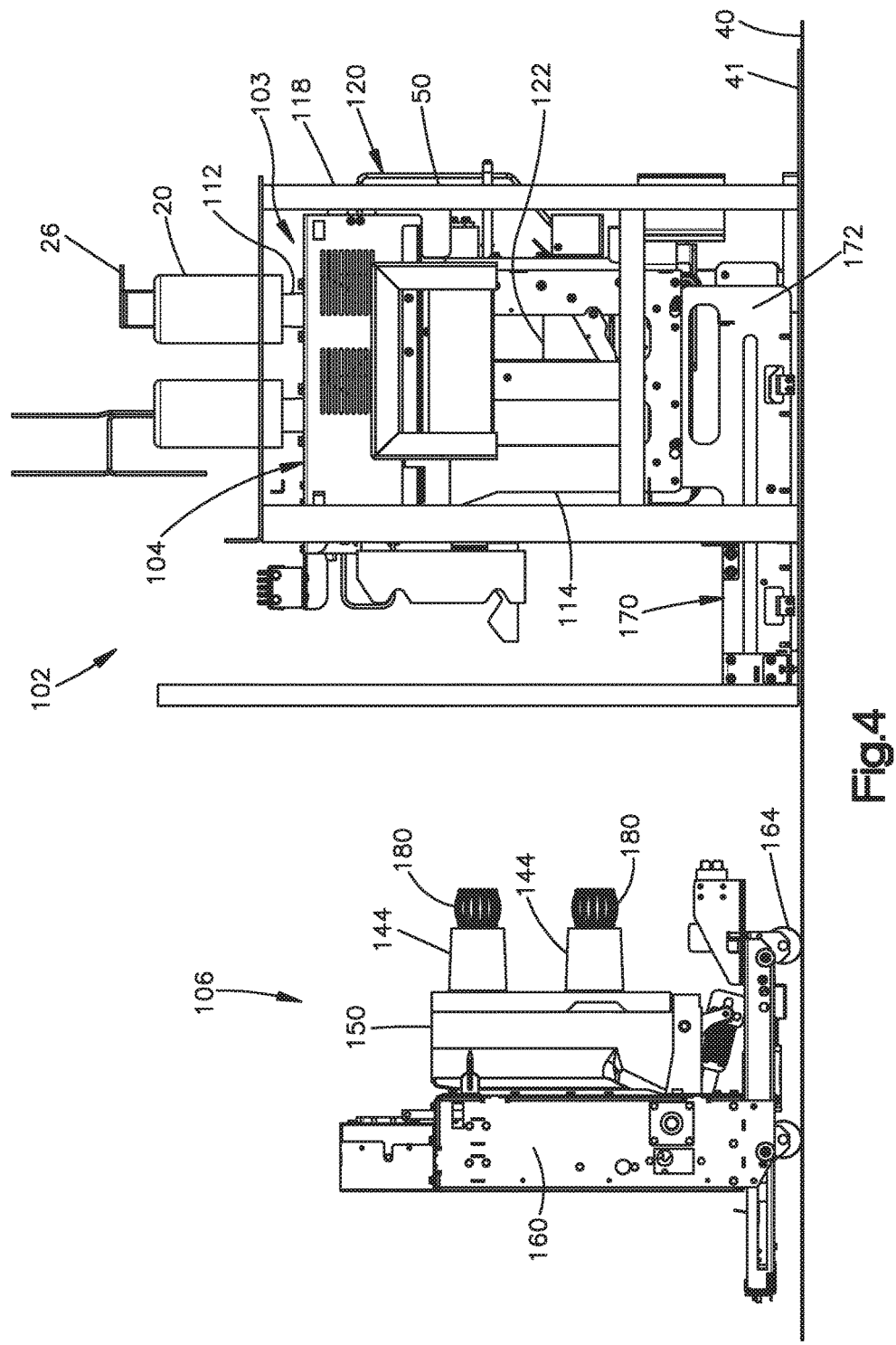
FIG. 4 is a side view of the switchgear cell and the adapter assembly installed in the cell.

With the adapter assembly 104 installed in the engaged position in the cell 103 as shown in FIG. 4, the draw-out assembly 106 can be rolled horizontally into operative engagement with the adapter assembly 104. Specifically, as the draw-out assembly 106 is moved toward and into engagement with the adapter assembly 104, the horizontal disconnects 144 on the draw-out assembly 106 move inward through the open front ends 124 of the tubular portions 122 of the bus work 120, and further into engagement with the horizontal disconnects 130 on the adapter assembly 104. As the draw-out assembly 106 moves inward toward the horizontal disconnects 130, the safety shutter assembly 131 opens to allow the horizontal disconnects 144 in the draw-out assembly 106 to engage the horizontal disconnects 130 in the adapter assembly 104. The illustrated example includes finger clusters 180 for establishing contact between the horizontal disconnects 144 and 130. Rolling the draw-out assembly 106 back outward likewise disengages the horizontal disconnects 144 and 130 from one another. The circuit breaker 160 is thus moved into and out of operative engagement with the stationary disconnects 20 and the associated bus work 26 on the cell 102.

Beneficially, the adapter assembly 104 is installed in the cell 103 independently of the draw-out assembly 106. This enables the draw-out assembly 106 to be moved horizontally into and out of engagement with the adapter assembly 104 while the adapter assembly 104 remains in the installed position. As a result, the circuit breaker 160 can be moved repeatedly into and out engagement with the stationary disconnects 20 on the frame 102 with only horizontal movement and without the need to repeatedly operate the lifting mechanism to raise or lower the circuit breaker 160 within the cell 103. Together, the adapter assembly 104 and the draw-out assembly 106 thus function as a conversion system for an existing switchgear assembly having stationary vertical disconnects that were designed to only accept a vertical draw-out assembly. Specifically, installation of the adapter assembly 104 into the cell 103 of the existing switchgear assembly converts it from a switchgear assembly capable of only accepting a vertical draw-out assembly as described above with reference to FIG. 1 to a switchgear assembly capable of accepting a horizontal draw-out assembly as described above with reference to FIG. 2.

This written description sets forth the best mode of carrying out the invention, and describes the invention so as to enable a person skilled in the art to make and use the invention, by presenting examples of the elements recited in the claims. The patentable scope of the invention is defined by the claims, and may include other examples that do not differ from the literal language of the claims, as well as equivalent examples with insubstantial differences from the literal language of the claims.

What is claimed is:

1. An apparatus for use with a frame defining at least one switchgear cell, stationary disconnects oriented vertically on the frame, and horizontal draw-out disconnects remote from the frame, the apparatus comprising:
   an adapter assembly including vertical adapter disconnects, horizontal adapter disconnects, and bus work connecting the vertical adapter disconnects with the horizontal adapter disconnects;
   wherein the adapter assembly is configured to take an installed position in the switchgear cell with the vertical adapter disconnects projecting upward into engagement with the stationary disconnects on the frame; and
   the adapter assembly is further configured for the horizontal adapter disconnects to engage and disengage from the horizontal draw-out disconnects upon movement of the horizontal draw-out disconnects horizontally into and out of engagement with the adapter assembly when the adapter assembly is in the installed position.

2. An apparatus as defined in claim 1 wherein the adapter assembly has wheels and is configured for rolling movement into and out of the cell.

3. An apparatus as defined in claim 2 wherein the adapter assembly is configured for rolling movement into the cell to a lower position in which the vertical adapter disconnects are aligned beneath the stationary disconnects on the frame.

4. An apparatus as defined in claim 3 wherein the adapter assembly is configured for movement vertically upward from the lower position to the installed position.

5. An apparatus as defined in claim 1 wherein the cell includes elevator members configured for vertical movement on the frame, and the adapter assembly has lift members configured to engage the elevator members in a weight-bearing relationship for the elevator members to raise and lower the adapter assembly within the cell.

6. An apparatus as defined in claim 1 wherein the adapter assembly has tubular portions with open ends, the horizontal adapter disconnects are located within the tubular portions, and the open ends are configured to provide access for the horizontal draw-out disconnects to reach the horizontal adapter disconnects upon movement inward through the open ends.

7. An apparatus for use with a switchgear assembly that includes vertical disconnects and a draw-out circuit breaker assembly that includes horizontal disconnects, the apparatus comprising:
   an adapter assembly including vertical disconnects, horizontal disconnects, and bus work connecting the vertical disconnects with the horizontal disconnects;
   wherein the adapter assembly is movable between a lowered position and a raised position where the vertical disconnects of the adapter engage the vertical disconnects of the switchgear assembly; and
   wherein, when the adapter assembly is in the raised position, the horizontal disconnects of the adapter assembly are configured to engage the horizontal disconnects on the draw-out circuit breaker assembly upon movement of the draw-out circuit breaker assembly into the switchgear assembly.

8. An apparatus as defined in claim 7 wherein the adapter assembly has wheels and is configured for rolling movement relative to the switchgear assembly.

9. An apparatus as defined in claim 7 wherein the adapter assembly is configured for rolling movement into the switchgear assembly to a lower position in which the vertical disconnects in the adapter assembly are aligned beneath the vertical disconnects of the switchgear assembly.

10. An apparatus as defined in claim 9 wherein the switchgear assembly includes elevator members configured for vertical movement, and the adapter assembly has lift members configured to engage the elevator members in a weight-bearing relationship for the elevator members to raise and lower the adapter assembly within the switchgear assembly.

11. An apparatus as defined in claim 7 wherein the adapter assembly has tubular portions with open ends, the horizontal disconnects on the adapter assembly are located within the tubular portions, and the open ends are configured to provide access for the horizontal disconnects on the draw-out circuit breaker assembly to reach the horizontal disconnects on the adapter assembly upon movement inward through the open ends.

12. A conversion system for use with a switchgear assembly having a frame that defines at least one switchgear cell and stationary disconnects oriented vertically on the frame, the apparatus comprising:
   an adapter assembly including vertical disconnects, horizontal disconnects, and a bus bar assembly connecting the vertical disconnects with the horizontal disconnects, wherein the adapter assembly is configured to take an installed position in the switchgear cell with the vertical disconnects projecting upward into engagement with the stationary disconnects; and
   a draw-out assembly including a circuit breaker, pole units operatively interconnected with the circuit breaker, and horizontal disconnects projecting from the pole units;
   wherein the draw-out assembly is configured to take an engaged position in which the horizontal disconnects on the draw-out assembly operatively engage the horizontal disconnects on the adapter assembly; and
   the draw-out assembly is further configured for movement horizontally into and out of the engaged position when the adapter assembly is in the installed position.

13. An apparatus as defined in claim 12 wherein the adapter assembly has wheels and is configured for rolling movement separately from the draw-out assembly.

14. An apparatus as defined in claim 12 wherein the adapter assembly is configured for movement horizontally into the cell to a lower position in which the vertical disconnects are aligned beneath the stationary disconnects, and is configured for movement vertically upward from the lower position to the installed position.

15. An apparatus as defined in claim 12 wherein the adapter assembly is configured for movement vertically upward into the installed position.

16. An apparatus as defined in claim 15 wherein the frame includes elevator members configured for vertical movement on the frame, and the adapter assembly has lift members configured to engage the elevator members in a weight-bearing relationship for the elevator members to raise and lower the adapter assembly within the cell.

17. An apparatus as defined in claim 12 wherein the draw-out assembly has wheels and is configured for rolling movement separately from the adapter assembly.

18. An apparatus as defined in claim 12 wherein the adapter assembly has tubular portions with open ends, the horizontal disconnects on the adapter assembly are located within the tubular portions, and the horizontal disconnects on the draw-out assembly are configured for movement inward through the open ends of the tubular portions upon movement of the draw-out assembly toward the engaged position.

19. A method of interconnecting horizontal draw-out disconnects with stationary disconnects oriented vertically on a switchgear frame defining a cell, the method comprising:
moving vertical disconnects horizontally into the cell to lower positions in which the vertical disconnects are aligned beneath the stationary disconnects;
moving the vertical disconnects vertically within the cell from the lower positions to raised positions in which the vertical disconnects engage the stationary disconnects; and
when the vertical disconnects are in the raised positions, moving horizontal draw-out disconnects horizontally into engaged positions in which the horizontal draw-out disconnects are electrically interconnected with the vertical disconnects.

20. A method as defined in claim 19, further comprising:
providing an adapter assembly that includes the vertical disconnects, and that further includes horizontal adapter disconnects and bus work connecting the vertical disconnects with the horizontal adapter disconnects;
moving the adapter assembly horizontally into the cell to a lower position in which the vertical disconnects are aligned beneath the stationary disconnects;
moving the adapter assembly vertically within the cell from the lower position to a raised position in which the vertical disconnects project upward into engagement with the stationary disconnects;
providing a horizontal draw-out assembly including a circuit breaker, pole units operatively interconnected with the circuit breaker, and the horizontal draw-out disconnects; and
when the adapter assembly is in the raised position, moving the draw-out assembly horizontally into an engaged position in which the horizontal draw-out disconnects in the draw-out assembly engage the horizontal adapter disconnects in the adapter assembly.

21. A method as defined in claim 20 wherein the adapter assembly is moved to the lower position by rolling the adapter assembly on wheels.

22. A method as defined in claim 20 wherein the draw-out assembly is moved to the engaged position by rolling the draw-out assembly on wheels.

\* \* \* \* \*